United States Patent
Steinfels et al.

(10) Patent No.: US 10,279,410 B2
(45) Date of Patent: May 7, 2019

(54) THREAD DIE RETAINING METHOD AND APPARATUS

(71) Applicant: STANLEY BLACK & DECKER, INC., Towson, MD (US)

(72) Inventors: Craig R. Steinfels, Powell, OH (US); Ian E. Random, Muskego, WI (US)

(73) Assignee: Stanley Black & Decker, Inc., New Britain, CT (US)

( * ) Notice: Subject to any disclaimer, the term of this patent is extended or adjusted under 35 U.S.C. 154(b) by 116 days.

(21) Appl. No.: 15/316,385

(22) PCT Filed: Jun. 3, 2015

(86) PCT No.: PCT/US2015/033934
§ 371 (c)(1),
(2) Date: Dec. 6, 2016

(87) PCT Pub. No.: WO2015/187798
PCT Pub. Date: Dec. 10, 2015

(65) Prior Publication Data
US 2018/0147644 A1    May 31, 2018

Related U.S. Application Data

(60) Provisional application No. 62/007,475, filed on Jun. 4, 2014.

(51) Int. Cl.
*B23G 1/30* (2006.01)
*B23G 1/26* (2006.01)

(52) U.S. Cl.
CPC .............. *B23G 1/261* (2013.01); *B23G 1/30* (2013.01); *Y10T 279/3481* (2015.01)

(58) Field of Classification Search
CPC .......... B23G 1/24; B23G 1/261; B23G 1/263; B23G 1/265; B23G 1/267; B23G 1/30; B23G 1/46; B23G 1/52; Y10T 279/3481
USPC ........................................... 470/207
See application file for complete search history.

(56) References Cited

U.S. PATENT DOCUMENTS

| | | | | |
|---|---|---|---|---|
| 1,285,866 A | * | 11/1918 | Wilson | A47L 11/164 279/155 |
| 1,450,211 A | * | 4/1923 | Kopp | B23G 5/04 408/123 |
| 1,571,515 A | * | 2/1926 | Fleming | B23G 1/22 408/201 |
| 2,273,598 A | * | 2/1942 | Shafer | B23G 1/265 408/200 |
| 2,349,400 A | * | 5/1944 | Beckwith | B23B 51/0453 144/23 |
| 2,417,813 A | * | 3/1947 | Curtis | B26F 1/3846 408/206 |
| 2,433,058 A | * | 12/1947 | Mesaros | B26D 7/1818 408/68 |
| 2,855,614 A | * | 10/1958 | Simon | B23G 1/261 184/45.1 |
| 3,715,168 A | * | 2/1973 | Kuhn | B23G 5/04 408/120 |

(Continued)

*Primary Examiner* — Daniel W Howell
(74) *Attorney, Agent, or Firm* — Caeden Drayton; Adan Ayala

(57) ABSTRACT

A retaining socket for receiving a thread die includes a plunge component that is moveable along the longitudinal axis of the retaining socket and at least one pin extending parallel to the longitudinal axis configured to engage the thread die.

7 Claims, 3 Drawing Sheets

(56) References Cited

U.S. PATENT DOCUMENTS

| | | | | |
|---|---|---|---|---|
| 4,095,917 A | * | 6/1978 | Wesner | ............... B23G 1/261 408/221 |
| 4,856,946 A | * | 8/1989 | Park | ............... B23G 1/48 408/122 |
| 7,736,100 B2 | * | 6/2010 | Evans | ............... B23B 31/005 279/83 |

* cited by examiner

THREAD DIE RETAINING METHOD AND APPARATUS

The present invention relates to thread die holders.

BACKGROUND OF THE INVENTION

Thread dies are well known and are used to cut threads on a bar, stud, or pipe, or to repair damaged threads. Typically, the thread die is inserted into a handle that includes an opening or socket for receiving the thread die and one or more set screws to retain the thread die in the socket. This configuration has worked well for years, but it can be inconvenient when different size thread dies are required. In addition, the set screws can become loose, allowing the thread die to fall out of the socket.

SUMMARY OF THE INVENTION

The present invention overcomes these and other disadvantages by providing a method and apparatus for retaining a thread die that includes means for retaining the thread die in a socket and means for moving the thread die out of the socket. A plunge component provides a convenient mechanism for moving the thread die out of the socket making it easy to change thread dies when required.

DETAILED DESCRIPTION OF THE DRAWINGS

Figure 1:
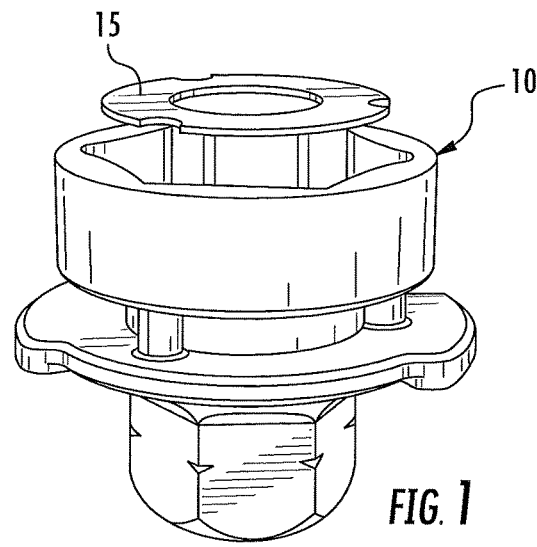
FIG. 1 is a perspective view of an exemplary adaptor.

FIG. 1 shows an exemplary thread die retaining socket 10 according to the present invention. The thread die retaining socket 10 includes an adaptor body 12, a plunge component 14, and means 15 to retain the thread die in the adaptor 10. The plunge component 14 cooperates with the means 15 to selectively retain a thread die in the socket 10.

Figure 2:
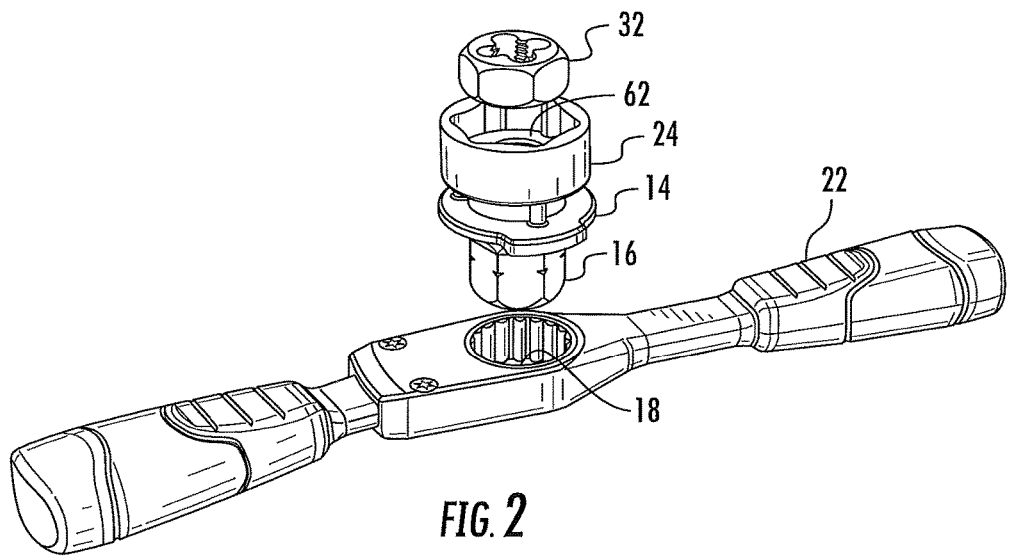
FIG. 2 illustrates the adaptor of FIG. 1 in position to be installed in a handle.
Figure 3:
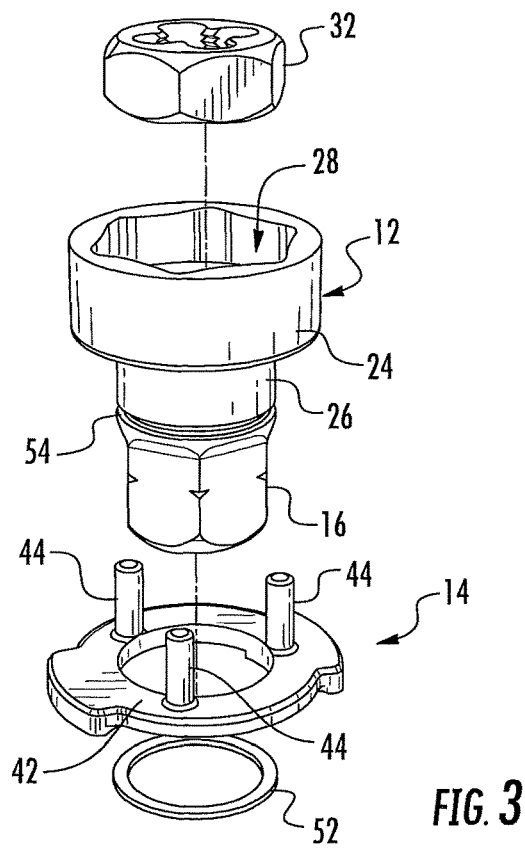
FIG. 3 is an exploded view of the adaptor of FIG. 1.
Figure 4:
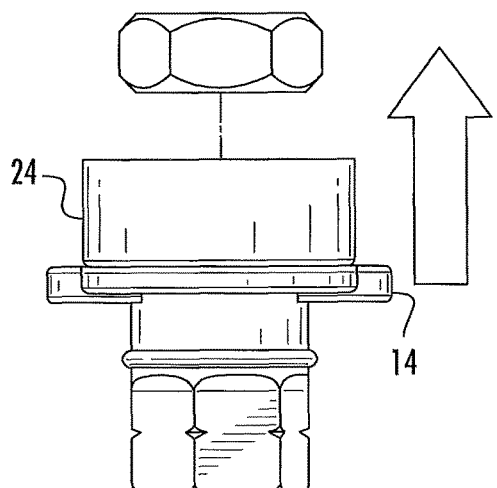
FIG. 4 illustrates the adaptor with the plunge component raised to eject the thread die.

The adaptor body 12 includes a handle engaging portion 16 configured to engage an aperture 18 formed in a handle 22, illustrated in FIG. 2. The adaptor body 12 further includes a retaining socket 24 and a shaft 26 extending between the handle engaging portion 16 and the retaining socket 24. A central bore 30 extends longitudinally through the adaptor body 12. The socket 24 includes a central cavity 28 for receiving a thread die 32, as illustrated in FIGS. 2-4. The central cavity 28 extends outwardly from the central bore 30, cooperating therewith to form a shoulder 34. The shoulder includes a plurality of apertures 36.

The plunge component 14 includes an annular disc 42 having a plurality of pins 44 extending vertically therefrom and a pair of diametrically opposed arms 46 extending radially outwardly from the disc 42. The pins 44 are located to be operatively disposed in the apertures 36 in the cavity 28. The disc 42 defines a central aperture 48 configured to slideably engage the shaft 26 of the adaptor body 12. The plunge component 14 is configured to move along the shaft 26 between a thread die retaining position, illustrated in FIG. 7, and a thread die ejecting position, illustrated in FIG. 6. An o-ring 52 engages a groove 54 formed in the shaft 26 to retain the plunge component 14 on the shaft 26.

Figure 5:
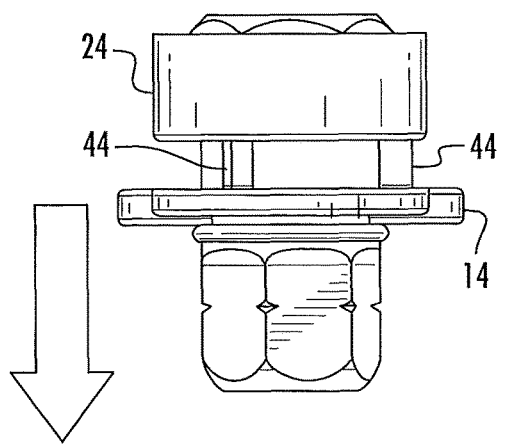
FIG. 5 illustrates the adaptor with the plunge component lowered to receive the thread die.
Figure 6:
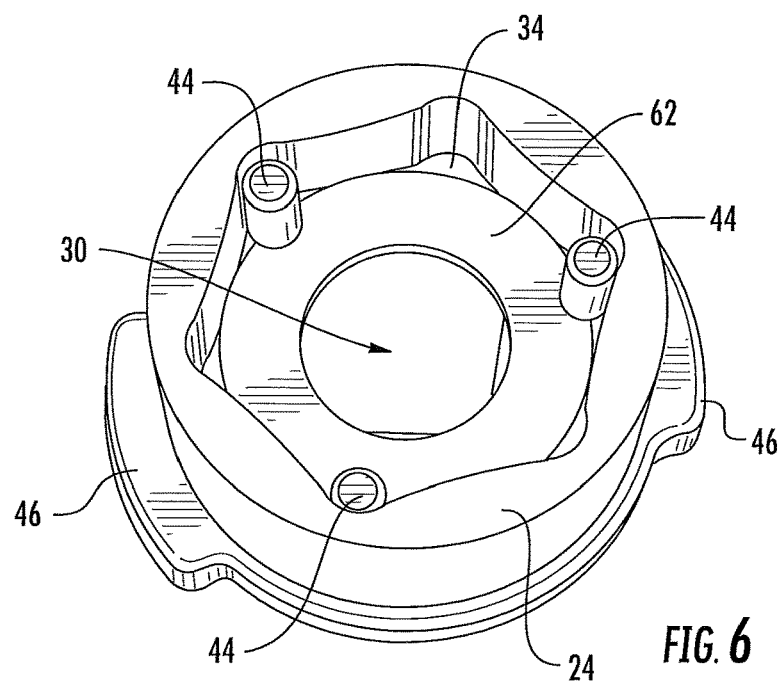
FIG. 6 illustrates the adaptor with the plunge component raised to eject the thread die.
Figure 7:
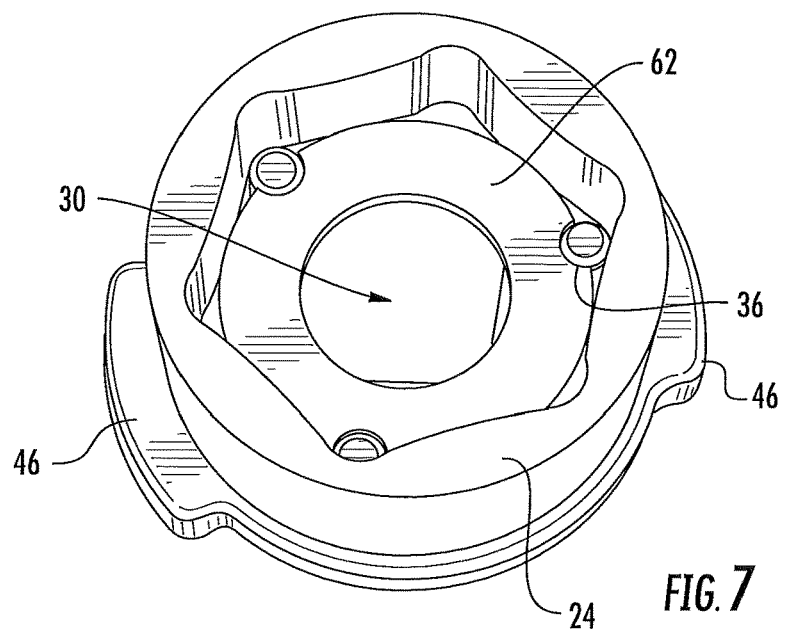
FIG. 7 illustrates the adaptor with the plunge component lowered to receive the thread die.

As illustrated in FIGS. 4 and 6, the plunge component 14 can be pushed upwardly, thereby pushing the pins 44 against a thread die 32 in the cavity 28 to at least partially eject the thread die 32 from the socket 24. Pushing the plunge component 14 upwardly lifts the thread die 32 at least partially out of the cavity 28 to a position where it can be grasped and removed from the cavity 28. When the plunge component 14 is pushed down away from the socket 24, as illustrated in FIGS. 5 and 7, the pins 44 are retracted, allowing a thread die 32 to be positioned in the cavity 28.

In one exemplary embodiment, the means 15 for retaining the thread die in the adaptor 10 includes a magnetic washer 62 disposed adjacent the shoulder 34 of the cavity 28. The washer 62 can be retained in the cavity 28 by any conventional method. In another embodiment, the means 15 can include a spring-and-ball detent mechanism. In yet another embodiment, the means 15 can include a magnet disposed in a sidewall of the socket 24. It will be readily apparent to one of ordinary skill in the art that still other methods of retaining the thread die 32 in the cavity 28 are available.

The invention claimed is:

1. A retaining socket for receiving a thread die comprising:
   a body including a longitudinal axis, a handle engaging portion and a thread die receiving cavity; and
   a plunge component including an annular disc having a central aperture, the plunge component being moveable along the longitudinal axis, and at least one pin extending parallel to the longitudinal axis from the annular disc into the cavity, the at least one pin being configured to engage the thread die.

2. The retaining socket of claim 1 further comprising means for retaining the thread die in the body.

3. The retaining socket of claim 2 wherein the means for retaining includes a magnetic washer.

4. A socket for receiving a thread die comprising:
   a body including a cavity configured to receive a thread die;
   a plunge component coupled to the body, wherein the plunge component includes at least one pin and a pair of arms, the at least one pin being disposed in the body to engage the thread die in response to movement of the arms; and
   means coupled to the body for retaining the thread die in the cavity.

5. The retaining socket of claim 4 wherein the means for retaining includes a magnetic washer.

6. A socket for receiving a thread die comprising:
   a body including a thread die receiving socket;
   means coupled to the adaptor body for retaining the thread die in the socket; and
   a plunge component including a plurality of pins for engaging the thread die, the plurality of pins extending into the socket.

7. A method of retaining a thread die comprising:
   providing a body including a longitudinal axis, a handle engaging portion, a thread die receiving cavity, and a shaft extending longitudinally between the handle engaging portion and the cavity; and
   providing a plunge component configured to move along the shaft between a thread die retaining position and a thread die ejecting position, and including at least one arm extending radially outwardly from the annular disc and at least one pin extending longitudinally from the annular disc; and providing retaining means coupled to the adaptor body, the retaining means cooperating with the plunge component to selectively retain the thread die in the cavity.

\* \* \* \* \*